Jan. 10, 1928.

H. C. CRANDALL

TIRE PUMPING MECHANISM

Filed March 2, 1927

1,655,986

INVENTOR.
Harry C. Crandall
BY Warren D. House
His ATTORNEY.

Witness:
R. E. Hamilton

Patented Jan. 10, 1928.

1,655,986

UNITED STATES PATENT OFFICE.

HARRY C. CRANDALL, OF KANSAS CITY, KANSAS.

TIRE-PUMPING MECHANISM.

Application filed March 2, 1927. Serial No. 171,992.

My invention relates to improvements in tire pumping mechanisms.

One of the objects of my invention is to provide a novel pumping mechanism for automatically pumping air into a pneumatic tire when the latter is running.

A further object of my invention is to provide novel signalling means for indicating when a tire becomes deflated.

Still another object of my invention is to provide novel pumping means by which, when the tire becomes deflated to a predetermined degree, the operation of pumping air into it will be automatically effected, but which will be inactive for the purpose when the tire is inflated to a certain pressure.

A further object of my invention is to provide a tire pumping mechanism of the kind described, which is simple, cheap, durable, not liable to get out of order, and which may be applied readily to wheels and tires now in use.

The novel features of my invention are hereinafter fully described and claimed.

In the accompanying drawing, which illustrates the preferred embodiment of my invention, as applied to a pneumatic tire having an inner tube.

Similar reference characters designate similar parts in the different views.

Figure 1:
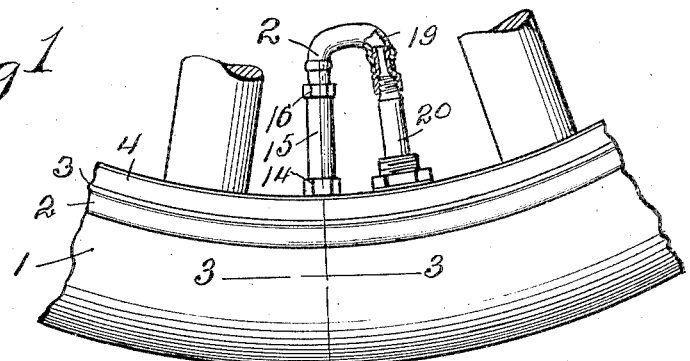
Fig. 1, is a view partly in side elevation and partly broken away of my improved pumping mechanism shown applied to an automobile wheel, part of which is shown.
Figure 2:
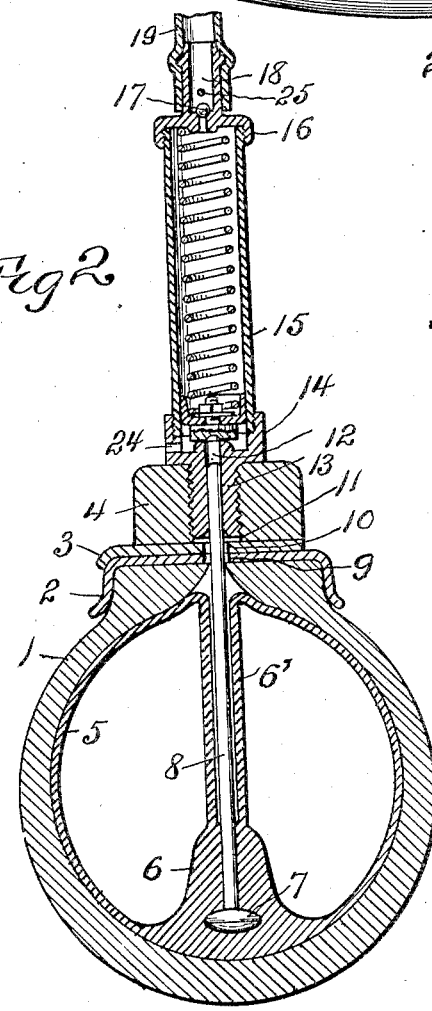
Fig. 2 is an enlarged vertical section on the line 2—2 of Fig. 1.
Figure 3:
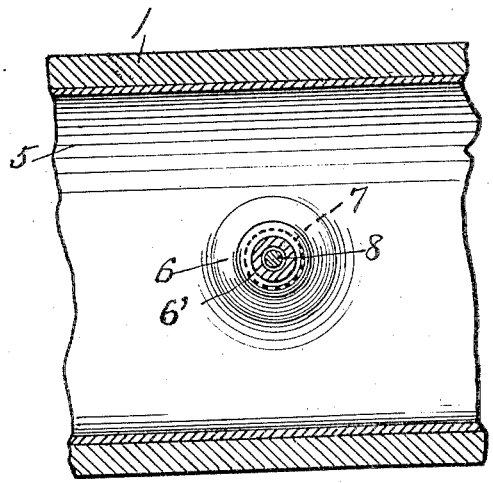
Fig. 3 is an enlarged section on the line 3—3 of Fig. 1.

1 designates the casing of a tire of usual type mounted in the usual rim 2, which is mounted on the usual metal felly 3, that is in turn mounted upon the wooden felly 4.

5 designates an inflatable inner tube mounted in the casing 1, and which is provided at the outer portion of its inner periphery with a thickened portion 6 which forms an inwardly extending hump in which is embedded the head 7 of a transverse operating member comprising a rod 8, which extends through a transverse integral tubular portion 6′ of the inner tube 5, said operating member 8 being extended through holes 9 and 10 provided respectively in the rim 2 and metal felly 3. The wooden felly 4 is provided with a radial threaded hole 11, which alines with the holes 9 and 10 and in which is longitudinally reciprocative the operating member 8, the latter being slidably fitted in a central hole 12 in the threaded stem 13 of the outer head 14 of the cylinder 15 of an air pump, the other end of which has an inner head 16 provided with an air outlet adapted to be closed by a ball check valve 17 which opens outwardly from the cylinder. The threaded stem 13 is fitted in the hole 11 and does not extend to the rim 2, thus permitting the removal of the latter without interference by the stem 13.

The cylinder head 16 is provided with a stem 18 on which is fitted a tube, 19, preferably a rubber tube, the other end of which is removably fitted on the filling tube 20 with which the inner tube 5 is provided in the usual manner.

Reciprocative in the cylinder 15 is a piston head 21, which has in its outer end a recess 22 adapted to receive the adjacent inner end of the operating member 8, when the tire is sufficiently deflated, and which is adapted to be forced inwardly thereby for the purpose of forcing air from the cylinder 15 through the tube 19 and filling tube 20 into the inner tube.

The head 14 is provided with an air inlet opening 24, through which air enters the cylinder 15, when the piston moves inwardly.

A cross pin 25 in the stem 18 keeps the ball 17 in place.

For forcing the piston head 21 outwardly it has bearing against its inner end one end of a coil spring 23, the other end of which bears against the head 16.

In the operation of the invention, the outer cylinder head 14 may be adjusted inwardly or outwardly, by means of its threaded stem 13, so as to bring the piston head 21 nearer or further from the operating member 8, to suit the amount of pressure that it is desired to carry in the tire. When the latter becomes deflated to a predetermined degree, the operating member will engage the piston head 21, when the tire is compressed by contact with the earth, and will force the piston head 21 inwardly against the pressure of the coil spring 23, thus forcing air from the cylinder 15 through the air conducting tube 19 and filling tube 20 into the inner tube 5. Upon every revolution of the tire, the piston head 21 will be forced inwardly, thus pumping air into the inner tube, and when the compression of the tire by the ground ceases, by continued turning of the tire, the spring 23 will force the piston head outwardly.

The ball check valve 17 is provided to prevent air passing outwardly from the inner tube into the cylinder in case, the usual valve in the filling tube is omitted or leaks if in use.

When the tire gets a puncture so as to deflate it faster than the pump will fill it, the hump 6 will bear against the inner opposite portion of the inner tube, so as to support the wheel, and when the wheel turns, a dropping of the wheel will occur, which will signal to the driver that he has a flat tire. The hump 6 also serves the additional function as a means for securely anchoring the adjacent end of the operating member 8.

When the tire is deflated to remove the rim 2, it is but necessary to slip off the rubber tube 19 from the filling tube 20, remove as usual the clamping nut of the latter, and laterally compress that portion of the tire having therein the operating member 8, thus withdrawing the operating member 8 from the stem 13 and metal felly 3, upon which the tire and rim 2 may be removed. After the tire is mended, it is placed on the rim, while deflated, and the rim is replaced, the tire at the portion containing the operating member 8 being laterally compressed to draw outwardly the member 8, thus permitting the latter to be slipped through the rim 2, and metal felly 3 into the stem 13. The clamping nut is then fitted, as usual on the filling tube 20, and the tire is inflated, after which the rubber tube 19 is again fitted on the filling tube 20, and the parts are again in their operative positions.

I do not limit my invention to the structure shown and described, as many modifications, within the scope of the appended claims, may be made without departing from the spirit of my invention.

What I claim is:—

1. In a tire pumping mechanism, a pneumatic tire comprising a casing and an inner tube therein, said inner tube having a thickened portion forming a hump which is provided with a radial tubular portion, said hump when the tire is sufficiently deflated and is revolved, produces a jarring action which serves as an alarm, and an operating member mounted in said hump and projecting through said tubular portion and the opposite side of the inner tube, a pump actuated by said operating member to compress air, when the tire is running and compressed at the portion adjacent to said hump, and an air conductor connecting the pump with said inner tube.

2. In a tire pumping mechanism, a wheel felly, a rim mounted thereon, and a pneumatic tire comprising a casing mounted on the rim and an inner tube in said casing having a filling tube extending through said felly, an air pump mounted on said felly and disposed out of the path traversed by the rim on its removal from the felly, an air conductor connecting said pump and said filling tube, and means actuated by the compression of said tire in running for operating said pump to force air through said conductor into said filling tube.

In testimony whereof I have signed my name to this specification.

HARRY C. CRANDALL.